(12) United States Patent
Crandall

(10) Patent No.: US 8,037,152 B2
(45) Date of Patent: Oct. 11, 2011

(54) ACTIVE REQUESTING OF INFORMATION FOR PSUEDO-LIVE PERFORMANCE

(75) Inventor: Evan Stephen Crandall, Basking Ridge, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 544 days.

(21) Appl. No.: 09/775,585

(22) Filed: Feb. 5, 2001

(65) Prior Publication Data

US 2002/0029291 A1 Mar. 7, 2002

Related U.S. Application Data

(63) Continuation-in-part of application No. 09/597,127, filed on Jun. 20, 2000.

(51) Int. Cl.
 *G06F 15/16* (2006.01)
(52) U.S. Cl. ........................................ 709/217; 709/231
(58) Field of Classification Search .................. 709/208, 709/246, 201, 202, 212, 213, 217, 231
See application file for complete search history.

(56) References Cited

U.S. PATENT DOCUMENTS

| | | | | |
|---|---|---|---|---|
| 5,045,850 A * | 9/1991 | Andros et al. | ................ | 340/7.28 |
| 5,455,626 A * | 10/1995 | Xu et al. | .................... | 348/385.1 |
| 5,539,465 A | 7/1996 | Xu et al. | | |
| 5,543,842 A | 8/1996 | Xu et al. | | |
| 5,600,573 A * | 2/1997 | Hendricks et al. | ............ | 725/109 |
| 5,701,582 A * | 12/1997 | DeBey | ........................... | 725/103 |
| 5,758,257 A * | 5/1998 | Herz et al. | .................... | 725/116 |
| 5,848,378 A * | 12/1998 | Shelton et al. | .................... | 702/3 |
| 5,892,914 A | 4/1999 | Pitts | | |
| 5,937,331 A | 8/1999 | Kalluri et al. | | |
| 5,940,073 A * | 8/1999 | Klosterman et al. | .......... | 715/721 |
| 5,945,988 A * | 8/1999 | Williams et al. | ............... | 715/747 |
| 5,978,828 A * | 11/1999 | Greer et al. | .................... | 709/224 |
| 6,002,832 A | 12/1999 | Yoneda | | |
| 6,029,045 A * | 2/2000 | Picco et al. | ...................... | 725/34 |
| 6,038,545 A * | 3/2000 | Mandeberg et al. | ............ | 705/15 |
| 6,055,246 A * | 4/2000 | Jones | ........................... | 370/503 |
| 6,055,619 A * | 4/2000 | North et al. | ..................... | 712/36 |
| 6,072,982 A * | 6/2000 | Haddad | ........................... | 725/93 |
| 6,128,652 A * | 10/2000 | Toh et al. | ....................... | 709/219 |
| 6,133,853 A * | 10/2000 | Obradovich et al. | ......... | 340/905 |
| 6,147,642 A * | 11/2000 | Perry et al. | ............... | 342/357.15 |
| 6,151,078 A * | 11/2000 | Yoneda et al. | ................ | 348/558 |
| 6,192,340 B1 * | 2/2001 | Abecassis | ...................... | 704/270 |
| 6,216,265 B1 * | 4/2001 | Roop et al. | ....................... | 725/54 |

(Continued)

OTHER PUBLICATIONS

U.S. Appl. No. 09/597,127, filed Jun. 2000, Crandall.

(Continued)

*Primary Examiner* — Kristie D Shingles

(57) ABSTRACT

Mass amounts of information, such as entire libraries of songs or movies, for example, may be stored locally near end-users, and this information may be accessed and reproduced in response to commands received from a transmitting station via a network. When a radio or television station desires to transmit a song or movie, for example, the radio or television station can, rather than transmitting the entire song or movie, merely transmit a command for reproducing the song or movie. An end-user's performance reproduction device, such as an enhanced radio or a television set, then accesses and reproduces the locally stored song or movie. Since the radio or television station need not transmit the entire performance, network traffic can be significantly reduced. The performance reproduction device may actively request information from the radio or television station when fresh or additional information is needed.

16 Claims, 12 Drawing Sheets

U.S. PATENT DOCUMENTS

| | | | | |
|---|---|---|---|---|
| 6,219,676 | B1 * | 4/2001 | Reiner | 707/201 |
| 6,249,810 | B1 * | 6/2001 | Kiraly | 709/217 |
| 6,269,394 | B1 * | 7/2001 | Kenner et al. | 709/217 |
| 6,292,827 | B1 | 9/2001 | Raz | |
| 6,345,293 | B1 * | 2/2002 | Chaddha | 709/219 |
| 6,381,314 | B1 * | 4/2002 | Walinski | 379/101.01 |
| 6,389,471 | B1 | 5/2002 | Agraharam et al. | |
| 6,418,138 | B1 * | 7/2002 | Cerf et al. | 370/352 |
| 6,425,825 | B1 * | 7/2002 | Sitrick | 463/31 |
| 6,446,261 | B1 * | 9/2002 | Rosser | 725/34 |
| 6,449,654 | B1 * | 9/2002 | Blackwell et al. | 709/232 |
| 6,462,646 | B2 * | 10/2002 | Helferich | 340/7.21 |
| 6,463,585 | B1 | 10/2002 | Hendricks et al. | |
| 6,496,856 | B1 * | 12/2002 | Kenner et al. | 709/218 |
| 6,513,052 | B1 * | 1/2003 | Binder | 707/204 |
| 6,513,069 | B1 * | 1/2003 | Abato et al. | 709/238 |
| 6,529,143 | B2 | 3/2003 | Mikkola et al. | |
| 6,529,586 | B1 * | 3/2003 | Elvins et al. | 379/88.13 |
| 6,538,623 | B1 * | 3/2003 | Parnian et al. | 345/8 |
| 6,549,768 | B1 | 4/2003 | Fraccaroli | |
| 6,581,075 | B1 * | 6/2003 | Guturu et al. | 707/201 |
| 6,588,015 | B1 | 7/2003 | Eyer et al. | |
| 6,600,898 | B1 * | 7/2003 | De Bonet et al. | 455/3.04 |
| 6,601,103 | B1 | 7/2003 | Goldschmidt et al. | |
| 6,633,910 | B1 * | 10/2003 | Rajan et al. | 709/224 |
| 6,643,620 | B1 * | 11/2003 | Contolini et al. | 704/270 |
| 6,643,690 | B2 * | 11/2003 | Duursma et al. | 709/217 |
| 6,650,348 | B2 * | 11/2003 | Mariani et al. | 715/853 |
| 6,664,922 | B1 * | 12/2003 | Fan | 342/357.1 |
| 6,665,688 | B1 * | 12/2003 | Callahan, II et al. | 707/200 |
| 6,684,249 | B1 * | 1/2004 | Frerichs et al. | 709/225 |
| 6,701,061 | B2 * | 3/2004 | Karasudani et al. | 386/46 |
| 6,718,551 | B1 * | 4/2004 | Swix et al. | 725/32 |
| 6,724,403 | B1 * | 4/2004 | Santoro et al. | 715/765 |
| 6,728,713 | B1 * | 4/2004 | Beach et al. | 707/10 |
| 6,741,834 | B1 * | 5/2004 | Godwin | 455/3.01 |
| 6,769,009 | B1 * | 7/2004 | Reisman | 709/201 |
| 6,785,551 | B1 * | 8/2004 | Richard | 455/456.1 |
| 6,792,615 | B1 * | 9/2004 | Rowe et al. | 725/37 |
| 6,799,201 | B1 * | 9/2004 | Lee et al. | 709/217 |
| 6,829,475 | B1 * | 12/2004 | Lee et al. | 455/419 |
| 6,839,680 | B1 * | 1/2005 | Liu et al. | 705/10 |
| 6,850,252 | B1 * | 2/2005 | Hoffberg | 715/716 |
| 6,952,221 | B1 * | 10/2005 | Holtz et al. | 715/723 |
| 6,993,290 | B1 * | 1/2006 | Gebis et al. | 455/45 |
| 7,107,548 | B2 * | 9/2006 | Shafron | 715/826 |
| 7,358,857 | B1 * | 4/2008 | White | 340/572.8 |
| 7,383,320 | B1 * | 6/2008 | Silberstein et al. | 709/219 |
| 7,395,031 | B1 * | 7/2008 | Ritter | 455/77 |
| 7,472,409 | B1 * | 12/2008 | Linton | 725/76 |
| 2001/0013124 | A1 | 8/2001 | Klosterman et al. | |
| 2001/0034786 | A1 * | 10/2001 | Baumeister et al. | 709/231 |
| 2003/0204854 | A1 | 10/2003 | Blackketter et al. | |

OTHER PUBLICATIONS

U.S. Appl. No. 09/597,428, filed Feb. 2001, Crandall.
U.S. Appl. No. 09/775,586, filed Jun. 2000, Crandall.
U.S. Appl. No. 09/775,657, filed Feb. 2001, Crandall.

* cited by examiner

ACTIVE REQUESTING OF INFORMATION FOR PSUEDO-LIVE PERFORMANCE

This application is a Continuation-In-Part of Application Ser. No. 09/597,428, filed on Jun. 20, 2000 now abandoned.

RELATED APPLICATIONS

This application is related to co-pending application Ser. No. 09/597,127, filed on Jun. 20, 2000.

BACKGROUND OF THE INVENTION

1. Field of Invention

This invention relates to pseudo-live performance.

2. Description of Related Art

Currently, performances such as radio or television broadcasts are transmitted to end-users via wireless and/or wired networks. Due to increased network traffic, better technology is needed to make more efficient use of available network resources.

SUMMARY OF THE INVENTION

This invention provides pseudo-live performance generator (PLPG) systems and methods that output performances using both locally stored information and transmitted information. Unlike conventional broadcasts (e.g., radio or television), the PLPG transmits one or more commands for generating a performance such as a song or movie. An end-user's performance reproduction device, such as an enhanced radio or television set, can then access and generate the performance by retrieving the song or movie from a local storage. A live performance may be "produced" immediately by the performance reproduction device by proper sequencing of the locally stored information including current weather reports, traffic, news, songs, movies, etc. Since commands may require much less network resources to broadcast, the PLPG may significantly reduce network traffic.

A performance reproduction device may actively request information to be transmitted when the performance reproduction device is available to receive information when a performance transmitter, such as a television station or radio station, is available to transmit information, and/or when an end-user programs the performance reproduction device to request information of a certain type or at a certain time. This request may be based on an activity status of the performance reproduction device, an activity status of a performance transmitter, an end-user profile, a performance transmitter profile, a status of a storage device, and/or the like.

The performance reproduction device may also request information from different performance transmitters to mix into a single performance. The performance reproduction device may locate performance transmitters by scanning or by using a position detecting system, such a Global Positioning System (GPS), in conjunction with a stored lookup table or the like.

These and other features and advantages of this invention are described in or are apparent from the following detailed description of exemplary embodiments.

BRIEF DESCRIPTION OF THE DRAWINGS

This invention will be described in detail with reference to the following figures, wherein like numerals represent like elements, and wherein.

DETAILED DESCRIPTION OF PREFERRED EMBODIMENTS

In typical radio or television transmission, a transmitting station transmits a mix of real-time performance, such as local news, weather forecasts and real-time comments by the announcer or disk jockey, for example, and stored information, such as movies, songs, advertisements and/or the like. The transmission of the performance is synchronized with the output of the performance by an output device such as a radio or television set. Depending on a particular programming, the real-time performance may constitute a relatively small portion of the total transmission of the broadcasting station.

If information, such as entire libraries of songs or movies, for example, are stored locally near end-users, this information can be accessed and reproduced in response to commands received from a transmitting station via a network. Instead of transmitting entire songs or movies, for example, the radio or television station can transmit a command for an end-user's performance reproduction device to reproduce the song or movie. The end-user's performance reproduction device, such as an enhanced radio or a television set, may access and reproduce the locally stored song or movie based on received commands. Since the radio or television station need not transmit the entire performance, network traffic can be significantly reduced. Additionally, since information is stored at or near the performance reproduction device and subsequently reproduced, commands and/or other information necessary to generate a performance may be transmitted asynchronously with generation of a performance. The commands and/or other information may be transmitted at speeds faster or slower than the performance. Thus, any available network resources may be used independent of the speed of transmission. Therefore, network resources may be utilized more efficiently.

Figure 1:
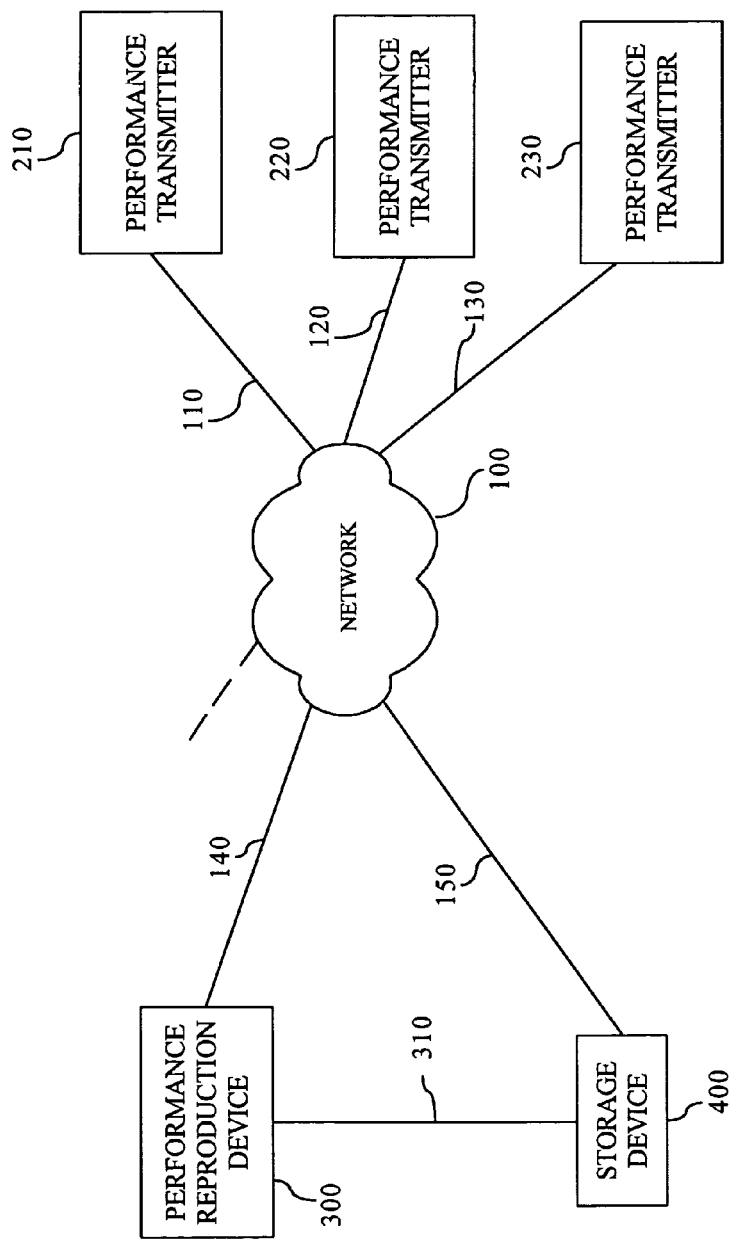
FIG. 1 is a diagram of a pseudo-live performance generator system.

FIG. 1 is a diagram of a network 100 that couples performance transmitters 210, 220 and 230 to a performance reproduction device 300. The network 100 may be any type of network or combinations of networks such as a cable network, telephone network, data network, broadcasting network, or the like over any type of medium, such as wired, wireless or optical. The performance transmitters 210, 220 and 230 are coupled to the network 100 by links 110, 120 and 130, respectively, which may be wired, wireless or optical, for example.

The performance transmitters 210, 220 and 230 may be, for example, radio or television broadcasting stations or any other type of performance transmitter adapted to transmit commands to performance reproduction device 300. The performance reproduction device 300 is coupled to the network 100 via a link 140, which may also be either wired, wireless or optical, for example. The performance reproduction device 300 may be, for example, an enhanced radio or television set of an end-user.

A storage device 400 is accessible by the performance reproduction device 300, and may be a mass storage device capable of storing a large quantity of information on the order of terabits or more, for example. The storage device 400 may be Read-Only Memory (ROM), erasable ROM, disk, flash, etc. Although shown separately and connected by a link 310, which may be wired, wireless or optical, the storage device 400 and the performance reproduction device 300 may be incorporated within the same physical unit, i.e., as part of the performance reproduction device 300. For example, the storage device 400 may be located within the enhanced radio or television set. If the storage device 400 is provided separately, the performance reproduction device 300 may directly retrieve information from the storage device 400. For example, the performance reproduction device 300 may access the storage device 400 located at a local server of the network 100 that is directly accessible via local connections. In this way, local network resources more dedicated to a smaller number of end-users are leveraged to conserve network resources that may be utilized by a larger number of end-users. Additionally, the storage device 400 may have its own connection with the network 100 via a link 150, which may be wired, wireless or optical.

Figure 2:
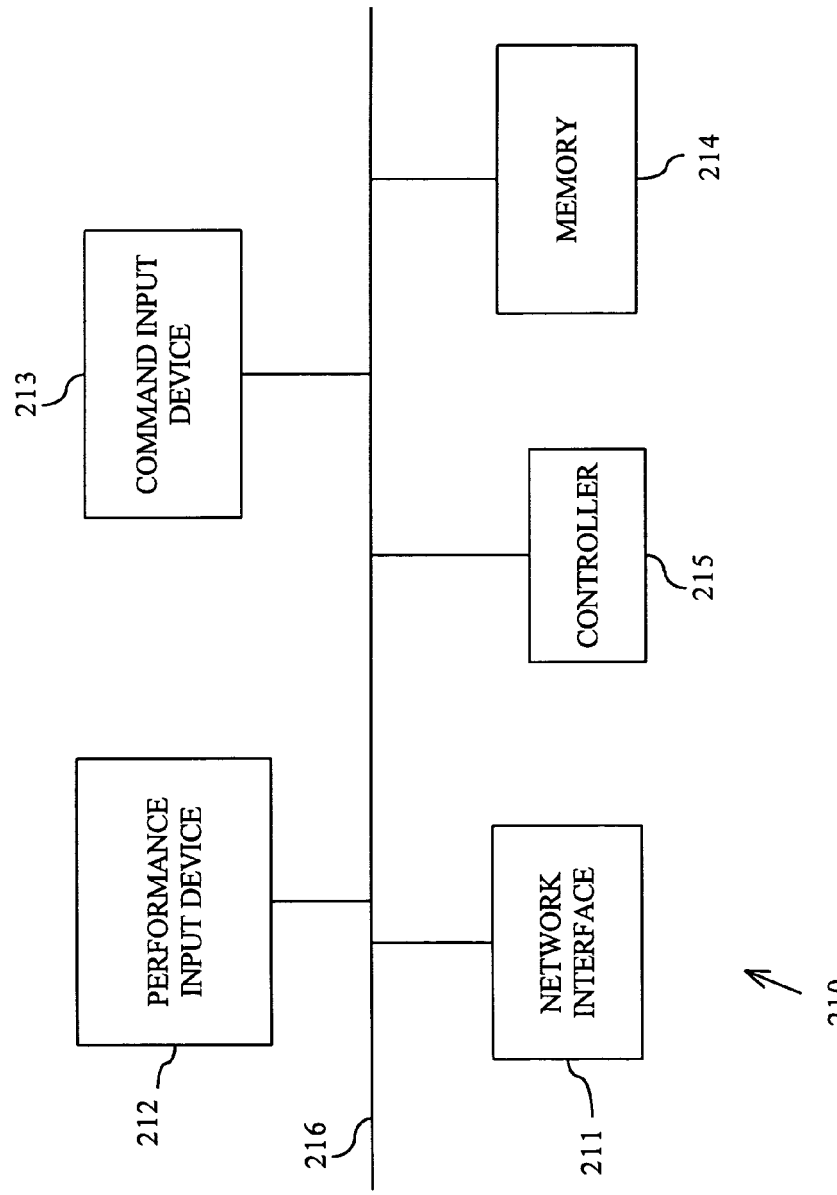
FIG. 2 is an exemplary block diagram of a performance transmitter of FIG. 1.

FIG. 2 shows an exemplary block diagram of the performance transmitter 210 of FIG. 1. The performance transmitter 210 may include a network interface 211, a performance input device 212, a mixing command input device 213, a memory 214, and a controller 215, all of which are interconnected by a signal bus 216.

The performance input device 212 receives performance information, such as real-time voice input from a radio announcer or a television news anchor, or receives pre-recorded information such as advertisements or the like. The real-time performance information may be transmitted directly to the network 100 via the network interface 211 or stored in the memory 214 and transmitted at a later time.

The command input device 213 may include one or more input devices (not shown), such as a keyboard, mouse, or one or more manual switches, that enable an operator to input one or more commands. The one or more commands may be transmitted to the network 100 via the network interface 211 or saved in the memory 214 for later transmission as controlled by the controller 215. The controller 215 may also generate new commands based on the commands received through the command input device 213. When received by a performance reproduction device 300, the commands may activate reproduction of performance information for a pseudo-live performance, or may initiate processes within the performance reproduction device 300, as described in more detail below.

Figure 3:
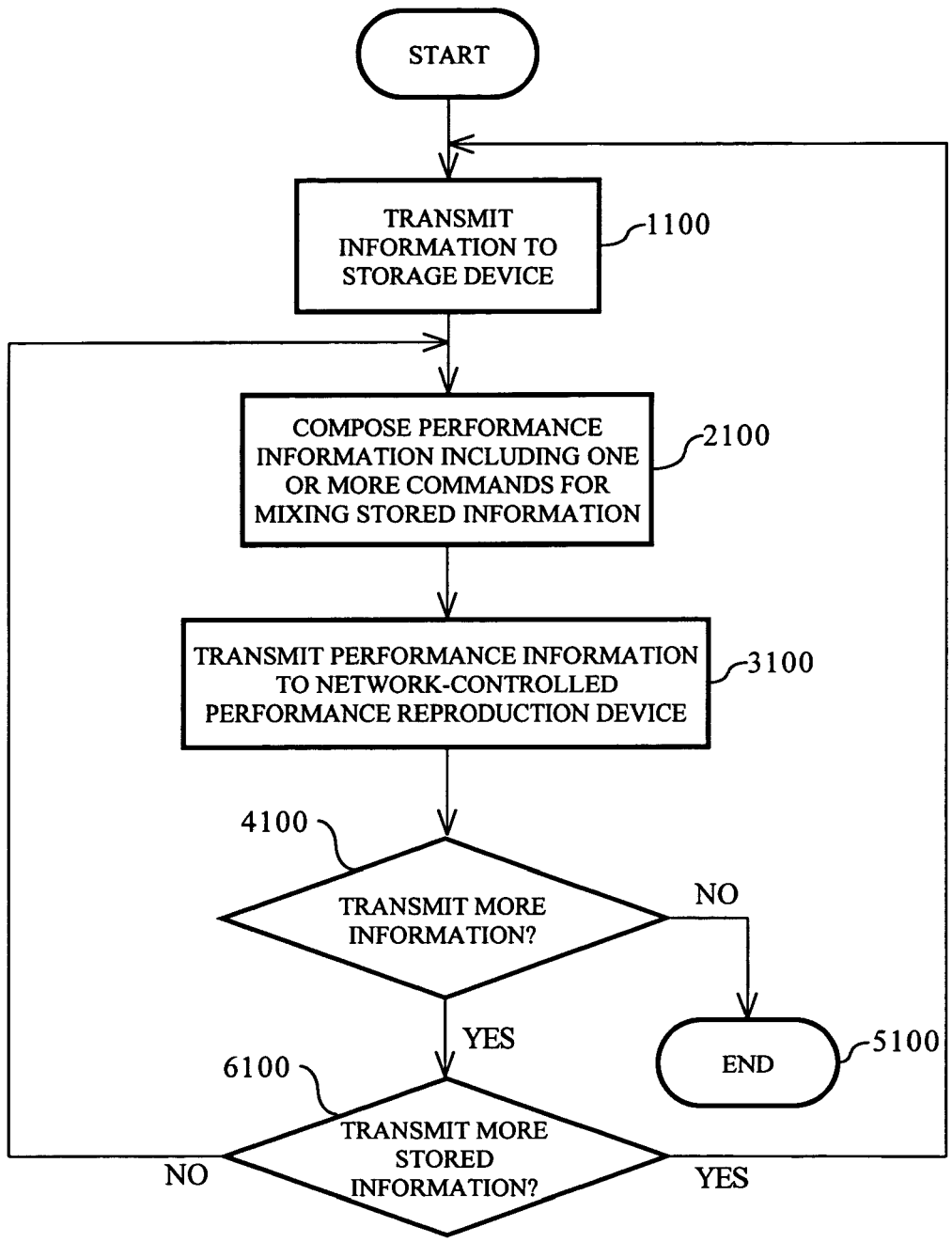
FIG. 3 is a flowchart of an exemplary method for transmitting a performance.

FIG. 3 is a flowchart of an exemplary process for transmitting a performance. In step 1100, the process transmits information such as songs, etc. to be stored in the storage device 400 via the network interface 210, for example. It should be appreciated that step 1100 may not be necessary because information may have been pre-stored in the storage device 400. The process then goes to step 2100. In step 2100, the process composes performance information including one or more commands for reproducing a performance based on the stored information. The one or more commands may include performance-oriented commands, housekeeping commands, programming commands, or the like, described in more detail below, and/or may include commands for accessing other commands already stored in the performance reproduction device 300, as also described in more detail below. The composed performance information may also include real-time performance information and/or stored performance information. The process then goes to step 3100.

In step 3100, the process transmits the performance information to a network-controlled performance reproduction device 300 and goes to step 4100. In step 4100, the process determines whether any more information is to be transmitted. If no more information is to be transmitted, the process goes to step 5100 and ends. If more information is to be transmitted, the process goes to step 6100 and determines whether the information to be transmitted is to be stored in the storage device. If the information to be transmitted is to be stored in the storage device, the process returns to step 1100. If the information to be transmitted is not to be stored in the storage device, i.e., if the information to be transmitted is one or more commands or the like that are to be used immediately or temporarily stored in a buffer separate from the storage device, the process returns to step 2100.

A transmitter may transmit data to the storage device while the performance reproduction device is reproducing stored information from the storage device 400. A radio station could transmit one or more commands to activate reproduction of stored information by the enhanced radio, for example; and then while the enhanced radio is reproducing the stored information, such as a song, transmit additional information, such as the following morning's news, for example. Furthermore, since the transmitter is not constrained to transmit synchronously with generation of the performance, the transmitter may transmit at speeds faster or slower than the performance. Thus, "bursting" technology or the like, in which information is transmitted at very high speeds, may be utilized. Further, if it is cost-effective to transmit data at slower-than-performance speeds using less-costly transmitting technology and equipment at off-peak periods of the network, for example, the information may be transmitted at slower-than-performance speeds.

In order to prevent unauthorized access, it may be desirable for the information stored in the storage device 400, or a portion of the information, to be encrypted such that it can only be read with the aid of a key. The key may be transmitted along with or as part of commands transmitted over the network 100. Alternatively, the key may be sent to an end-user separately by e-mail, regular mail, or be included with the performance reproduction device 300 (i.e., installed with the hardware), for example. The keys may be sent upon receipt of monthly payments, for example, or special keys may be sent to the end-user as a promotional tool for new features already stored in the storage device 400.

Figure 4:
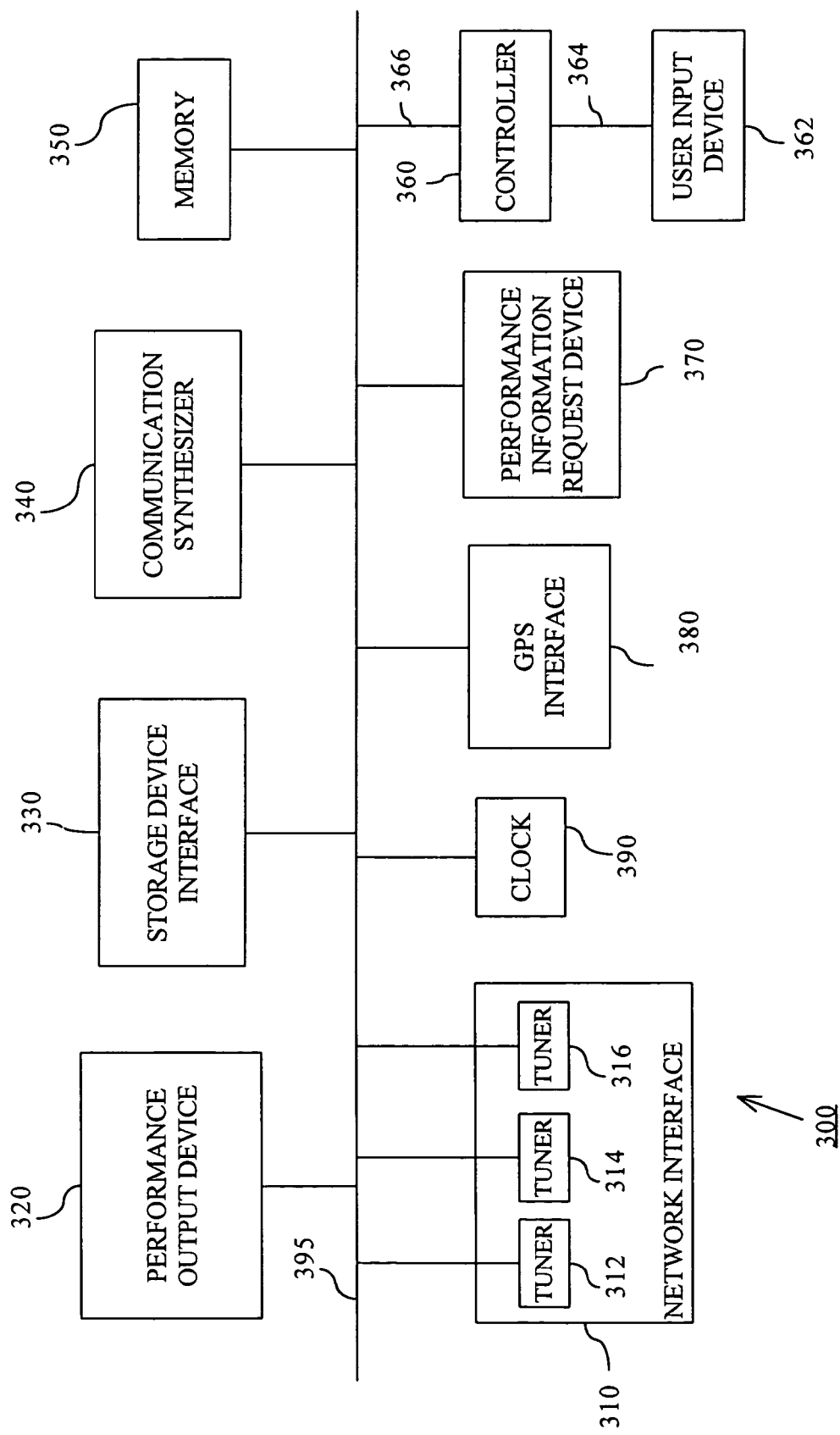
FIG. 4 is an exemplary block diagram of a performance reproduction device of FIG. 1.

FIG. 4 is an exemplary block diagram of the performance reproduction device 300. The performance reproduction device 300 may include a network interface 310, a performance output device 320, a storage device interface 330, a communication synthesizer 340, a memory 350, a controller 360, a performance information request device 370, and a Global Positioning System (GPS) interface 380, and a clock 390, all of which are interconnected by a signal bus 395. While a bus architecture is illustrated for convenience, one of ordinary skill would know to use other architectures as the implementation circumstances may dictate.

The performance reproduction device 300 receives performance information from the network 100 and may transmit requests for performance information to the network 100 via the network interface 310. The network interface 310 may include wired, optical or wireless interfaces such as an antenna, satellite dish or the like. The network interface 310 may include a plurality of tuners represented by tuners 312, 314 and 316, each of which tune to a different performance transmitter. Having multiple tuners allows the performance reproduction device 300 to receive and/or record information simultaneously from more than one performance transmitter. However, it should be appreciated that some embodiments of this invention do not require multiple tuners.

The communication synthesizer 340 may perform audio or video synthesis. For example, if text data of a news broadcast or the like is received from the network 100, the communication synthesizer 340 may, using known or later-developed techniques, generate a spoken reproduction of the news broadcast based on the text data. As another example, when the performance reproduction device 300 is an enhanced television or the like, the communication synthesizer 340 may, using known or later-developed techniques, generate a video of a "virtual weatherman" giving a weather report based on text or other data received from the network 100. The communication synthesizer 340 may include an input device that allows an end-user to select synthesis options. For example, the end-user could select desired voice characteristics, a favorite newscaster, actor, or actress, or sign language or close-captioning options to be used in generating the pseudo-live performance. Language translation functions may also be provided in the communication synthesizer 340 so that, for example, an end-user may "tune in" to an English radio station, but hear the performance in Spanish.

The memory 350 may store data such as programs or control parameters and may also serve as a buffer for information received from the network 100. For example, the memory 350 may store information transferred from, or information to be transferred to, the storage device 400 or buffer information received from the network 100. In fact, the memory 350 may be a part of the storage device 400 or vice versa. The controller 360 controls where the information received from the network 100 is stored.

When the performance information is received from the network 100 via the network interface 310, the controller 360 may cause the performance information to be sent directly to the performance output device 320 or stored in the memory 350 for later output based on commands either received from the network 100 or generated by a program in the memory, for example. The program may function based on a profile that indicates end-user preferences. When a command is received from the network 100 via the network interface 310, the controller 360 may, based upon the command, retrieve information from the memory 350 or from the storage device 400 via the storage device interface 330 for output to the performance output device 320 for the pseudo-live performance.

The controller 360 may cause performance information received from the network 100 to be stored in the storage device 400 for subsequent reproduction. The controller 360 may even cause performance information to be sent to the performance output device 320 and the storage device 400 at the same time. For example, when the performance information is a newly released song or movie, it may be output via a speaker or television monitor while being transmitted from a transmitting station, and simultaneously recorded in the storage device 400 for subsequent reproduction. A user input device 362, attached to the controller 360 via a link 364, allows an end-user to input information to program the performance reproduction device 300 via the controller 360, for example.

It should be appreciated that the link 364, as well as a link 366 between the controller 360 and the signal bus 395, may be wired, wireless or optical. For example, the user input device 362 and the controller may in incorporated into a remote control unit or the like.

The performance information request device 370 performs functions necessary to receive information from the network 100. For example, the performance information request device 370 may generate information requests. These information requests may include requests for storage information, such as entire movies or songs, or libraries of movies or songs, to store for subsequent reproduction. The information requests may also include requests for performance information, such as information for mixing with previously stored information for generating a performance. The latter type of information may be or include commands for mixing previously stored information to compose a performance. The performance information request device 370 may generate information requests based on a status of the performance reproduction device 300, a status of the performance transmitters 210, 220 and/or 230, a status of the storage device 400, and/or stored profile information, as described in more detail below.

The performance information request device 370 may perform other processes to receive information. For example, the performance information request device 370 may maintain a schedule of when transmitting stations are transmitting performance information (commands or live performances) and tune to the appropriate stations during transmission time to receive the needed performance information. The schedule may be obtained from a known channel that constantly transmits such information, received upon request from a designated channel, or purchased from a store and loaded into the performance reproduction device 300 and made available to the performance information request device 370.

The schedule may include information for all transmitting stations for a geographic area such as Northern America, for example. In this case, the performance information request device 370 may selected from the schedule those stations that are local to the physical location of the performance reproduction device 300 and transmit a request or otherwise obtain the desired performance information. The physical location may be obtained from the GPS interface based on the well known GPS system.

The schedule may indicate for a particular station that performance information may be available on request during a specific period of time such as from midnight to 3:00 am, for example. Based on this type of information, the performance information request device 370 may delay sending the request for information for that station until the specified time. Thus, the performance information request device 370 may use any number of techniques to obtain performance information so that a performance may be generated on demand.

The clock 390 maintains the current time and outputs a clock signal for use as needed by other components of the performance reproduction device 300. The clock 390 preferably synchronizes with a network clock (not shown) based on a signal received from the network 100 via the network interface 310, so that, for example, sending a request signal, tuning in to a channel to receive information, etc. can be performed at the proper time.

It should be appreciated that there are also other suitable methods of determining an appropriate performance transmitter from which to request information. For example, the controller 360 may control the tuner 312, the tuner 314 and/or the tuner 316 to scan for local performance transmitters. In this case, the GPS interface 380 may not be necessary. However, when performance transmitters are not continuously broadcasting, the GPS-based method is preferable because it determines an appropriate performance transmitter from which to request information even if the appropriate transmitter is not currently broadcasting.

Figure 5:
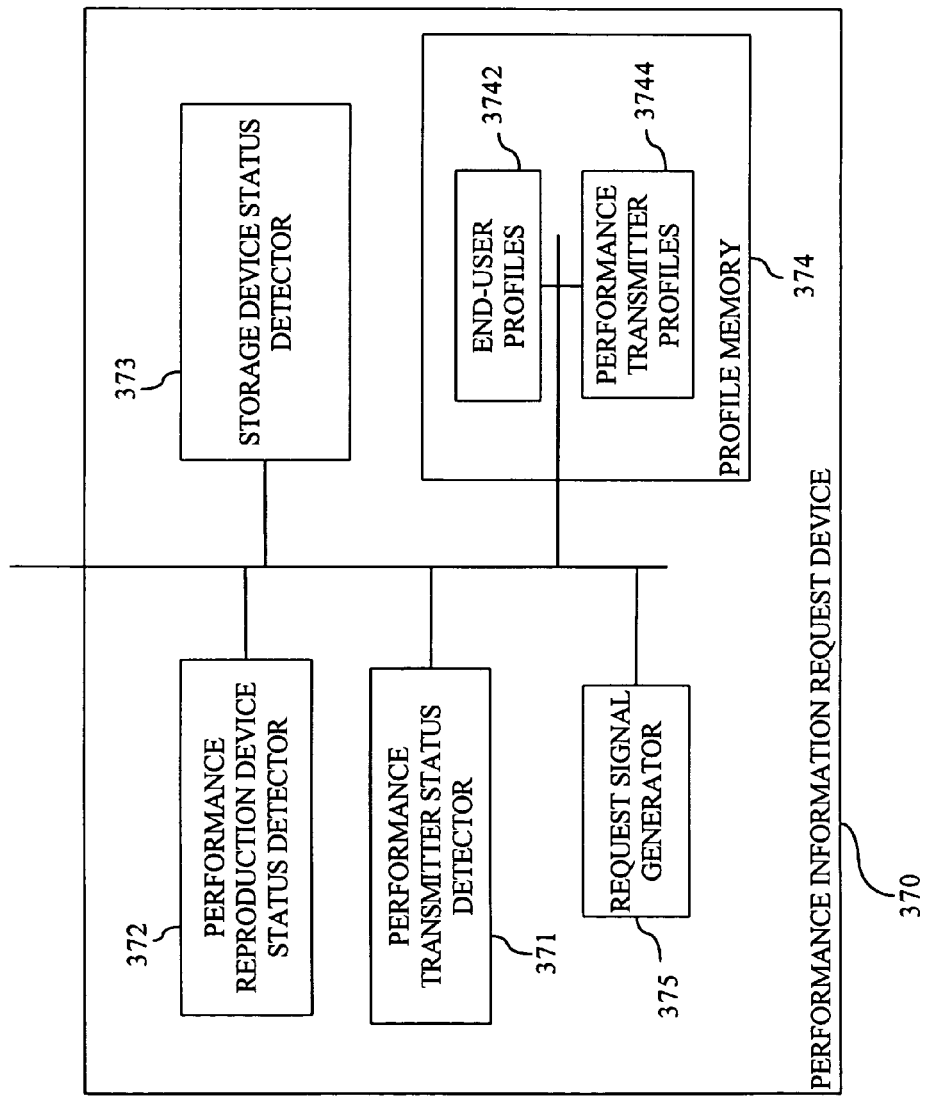
FIG. 5 is an exemplary block diagram of a performance information request device of FIG. 4.

FIG. 5 shows an exemplary diagram of the performance information request device 370. The performance request device 370 may include a performance transmitter status detector 371, a performance reproduction device status detector 372, a storage device status detector 373, and/or a profile memory 374, as well as a request signal generator 375. The profile memory 374 may include one or more end-user profiles 3742 and/or one or more performance transmitter profiles 3744, described in more detail below. The performance information request device 370 may have its own controller and/or memory, but in the depicted embodiment, the components of the performance information request device 370 operate under the control of the controller 360 of FIG. 4, and any necessary programs or data used by the performance information request device 370 are stored in the memory 350 of FIG. 4.

The performance transmitter status detector 371 may determine whether the performance transmitter 210, 220 and/or 230 of FIG. 1 are currently available to transmit information. This determination may be made by passively receiving a signal from the performance transmitter 210, 220 and/or 230, or by actively sending a query signal, for example.

The performance reproduction device status detector 372 detects whether the performance reproduction device 300 can currently receive information. This determination may be (or include) a determination of whether the performance reproduction device 300 is currently in an "ON" state, and/or currently has the processing resources available to receive and store information.

The storage device status detector 373 may, for example, determine whether information in the storage device 400 is up-to-date, or whether more information is needed in order to be up-to-date. This determination may be made by examining the time and/or storage device section of the last data writing event in the storage device 400. For example, if the storage device 400 contains a section for daily weather, and if this section has not yet been written to for the current day, it can be determined that the storage device needs fresh data in order to be up-to-date. The controller 360 may also transmit a query to determine a time of the latest update. If a time stamp of the weather information does not match the time of the latest update, then an update is required, for example.

The profile memory 374 may store end-user profiles 3742 and/or performance transmitter profiles 3744. The end-user profiles may, for example, indicate what type of information an end-user wants recorded, and/or when the end-user wants it recorded. For example, an end-user may work in an underground gold mine on Monday through Friday, and have no interest in hearing weather reports for those days, wishing only to hear weekend weather reports. Such an end-user could, via the user input device 362 (FIG. 4), modify his or her profile to instruct that no week-day weather reports are needed. Another end-user may utterly detest rap music, and modify his or her profile to instruct that no rap music selections should be reproduced or stored. As another example, an end-user could designate a period of time during which he or she does not intend to use the reproduction device 300, such as during a vacation or the like, so the PLPG system could avoid needlessly storing weather and traffic information or the like that will be obsolete by the time the end-user returns.

The performance transmitter profiles 3744 may, for example, indicate set times at which performance transmitters, such as radio or television stations, broadcast data for storing. The performance transmitter profiles 3744 may also indicate predicted peak times of network use by individual performance transmitters, and/or performance transmitter capability information, such as whether a particular performance transmitter has the capability to respond immediately to individual user requests for information.

For example, one performance transmitter may have resources to respond individually to any user request for information. Another performance transmitter may not be able to respond to individual requests for information, and may instead do a general update broadcast every hour, for example, to transmit fresh information to all end-users who are tuned in at that moment. In the former case, the controller 360 would determine that an information request signal could instantly be generated and transmitted from the performance reproduction device 300. In the latter case, the controller 360 would determine, based on the general update broadcast time(s) indicated in the transmitter profile, when to tune in to the performance transmitter to receive the update information. The controller 360 may also determine whether information was received from the performance transmitter at the last scheduled general update broadcast time, and only request information if information was not received at the last scheduled general update broadcast time (e.g., because the performance reproduction device 300 was turned off).

The request signal generator 375 generates a signal requesting information based upon information from any combination of the performance transmitter status detector 371, the performance reproduction device status detector 372, the storage device status detector 373, the profile memory 374, and direct user input from the user input device 362. It should be appreciated that, in some embodiments, or in some situations, the request signal generator 375 is not used because, for example, the performance information request device 370 may merely provide information instructing the performance reproduction device 300 to tune in to a certain performance transmitter at a certain time. In this case, no request signal needs to be generated.

A request signal generated by the request signal generator 375 may request fresh information, such as information to update the news or weather sections of the storage device 400, or may request specific types or selections of information. For example, an end-user may program the performance reproduction device 300 to request transmission of a particular song played earlier in the day. As another example, an end-user may be doing a research project on weather patterns, and may program the performance reproduction device 300 to request transmission from a radio station of selected weather reports from over the last ten years. As yet another example, a user may be interested in certain types of products, and may request, either directly or via an end-user profile, for certain types of commercials to be transmitted for reproduction during commercial breaks. It will be appreciated that, in some of these examples, the end-user may need to have control over the timing of the reproduction of stored information, and thus may use the performance reproduction device 300 and the storage device 400 essentially like a conventional video or audio recording device.

Figure 6:
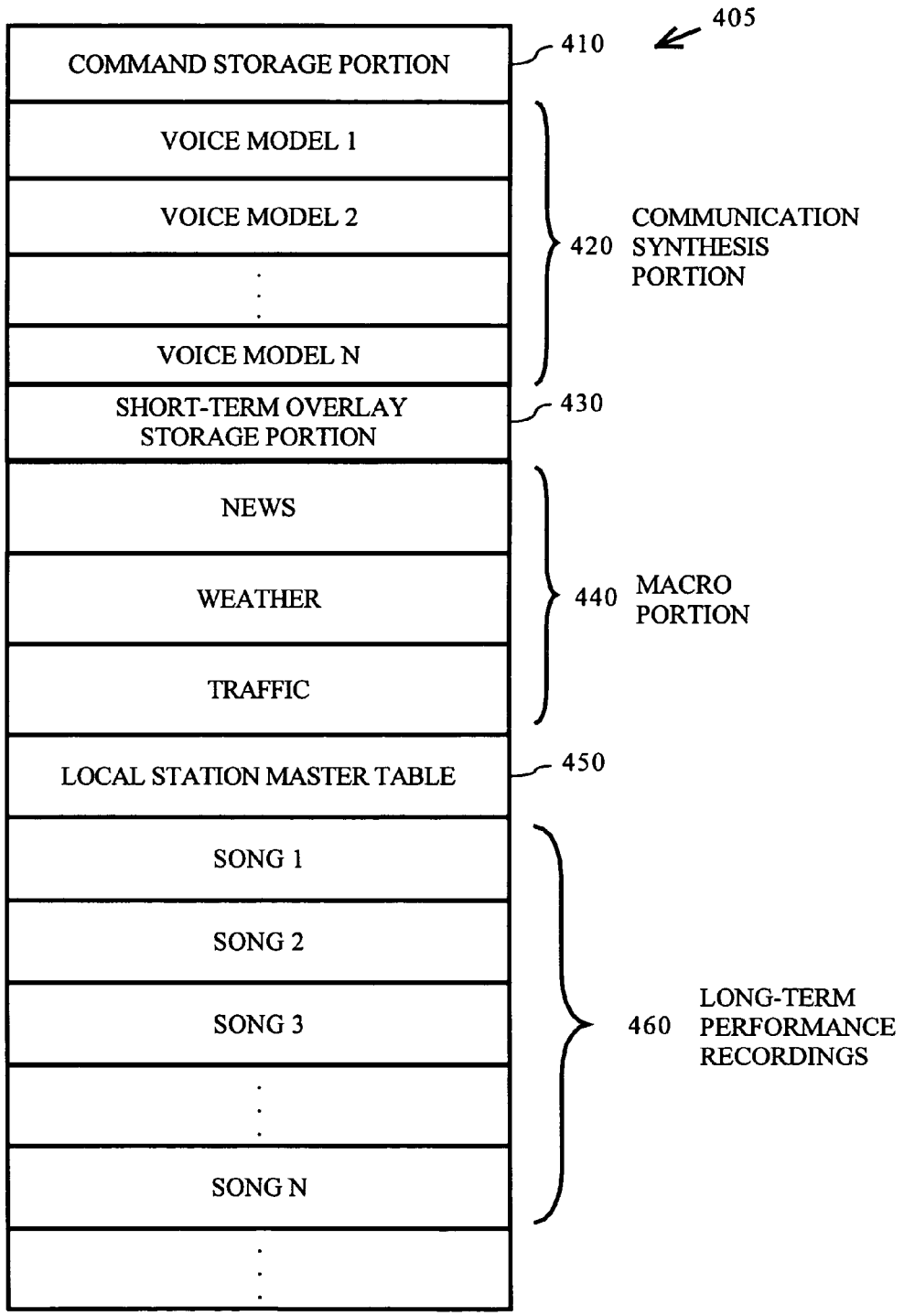
FIG. 6 is an exemplary diagram showing content of a storage device of FIG. 1.

FIG. 6 shows an exemplary diagram of the storage device contents 405. The storage device contents 405 may include a command storage portion 410, a communication synthesis portion 420 including voice models and/or other communication synthesis data, a short-term overlay storage 430, a macro portion 440 including news, weather and traffic storage portions, for example, a local station master table 450, and long-term performance recordings 460 such as songs 1-N where N is a positive integer.

The command storage portion 410 may store individual commands and/or command sequences, such as are described in detail below. Furthermore, the command portion may contain pre-stored commands or command sequences, and/or commands or command sequences that have been transmitted over the network 100.

Commands may include performance commands, housekeeping commands, programming commands (i.e., software programs as compared to "radio" programs, for example) or the like. Performance commands may be, for example, commands for reproducing information from specified locations of the storage device 400. Examples of performance commands are given in the following Table 1.

TABLE 1

| 1 | Command Code | Time | Duration | Pointer | — |
|---|---|---|---|---|---|
| 2 | Play 1 | Immediate | 5 min. | attached | — |
| 3 | Play 2 | 12:00 p.m. | 2 min. | file id | — |
| 4 | Repeat daily | 12:02 p.m. | <5 min. | macro id | — |
| . | . | . | . | . | . |
| . | . | . | . | . | . |
| . | . | . | . | . | . |

Row 1 of Table 1 shows that a performance command may include a command code, time, duration, and pointer parameters, for example. Other parameters may also be included in a command as indicated by the dashes. Rows 2-4 show examples of possible commands. Row 2 shows a "Play 1" command code that instructs the performance reproduction device 300 to output performance information appended to the command beginning immediately and continuing for five minutes. The Play 1 command code may also include a pointer to a file in the storage device 400. For example, a special value of "$FFFF_X$" may indicate "attached" and any other value may indicate a pointer in the storage device 400.

Row 3 shows a "Play 2" command code that instructs the performance reproduction device 300 to reproduce a stored information located at file id beginning at 12:00 p.m. and continuing for 2 minutes. Row 4 shows a "Repeat daily" command code that instructs the performance reproduction device 300 to generate a performance using a macro at macro id beginning at 12:00 p.m. and continuing for less than five minutes. A macro may be a predetermined sequence of commands or special set of program instructions to perform a sequence of functions. The "Repeat daily" command may, for example, execute a macro that reproduces a news broadcast using the above-described communication synthesizer 340.

In the above-described performance commands, the "duration" may correspond exactly to the duration of the information to be reproduced. Alternatively, the performance reproduction device 300 may, for example, insert predetermined filler material before and/or after the stored information, and/or increase or decrease the playback speed (e.g., by evenly distributing or removing short intervals of silence, or actually increasing or decreasing the time used for playback) in order to fill the instructed duration. For example, if the indicated "duration" is five minutes, but the stored information only requires four minutes and fifty-three seconds to reproduce, the performance reproduction device may insert a six-second message, such as "You are listening to station 98.7, WMZQ", and a one-second interval of silence. Alternatively, rather than containing a "duration" designation, a command may contain instructions to begin a performance reproduction after a previous command has been executed, without reference to a particular time of day.

Housekeeping commands may include, for example, commands for manipulating or reorganizing information in the storage device 400. Some examples of housekeeping commands are given in the following Table 2.

TABLE 2

| 1 | Command Code | Type | Size | Pointer or Name | — |
|---|---|---|---|---|---|
| 2 | Load | movie | 33 Gigabytes | attached | — |
| 3 | Delete | traffic | 11 Megabytes | file id | — |
| 4 | Overlay | weather | 18 Megabytes | file id | — |
| 5 | Change | voice model | 18 Megabytes | file id | — |
| . | . | . | . | . | . |
| . | . | . | . | . | . |
| . | . | . | . | . | . |

Row 1 of Table 2 shows that a performance command may include a command code and type, size, and pointer or name parameters, for example. Additional or alternative parameters may also be included in a command. Rows 2-5 show examples of housekeeping commands. Row 2 shows a "Load" command that loads an attached (i.e., being transmitted via the network 100) 33 Gigabyte movie to a specified location of the storage device 400. Row 3 shows a "Delete" command that instructs that stored traffic information is to be deleted. Row 4 shows an "Overlay" command that instructs that stored weather information is to be replaced with new information. Row 5 shows a "Change" command that changes a voice model of a particular anchor person due to an actual change in the voice of the anchor person (e.g., if the anchor person caught a cold).

Programming commands (software programs) may include, for example, software instructions for controlling the performance reproduction device 300 to generate pseudo-live performance. For example, there may be programming commands such as "case statement", "loop", "if-then-else" and/or the like. Such well known commands may be used to create macros or complete program productions based on information received over the network 100 and/or information retrieved from the storage device 400.

The communication synthesis portion 420 of the storage device contents may contain voice models, image models and/or the like that the performance reproduction device 300 accesses to generate a synthesized performance based on text data or the like. For example, voice model 1 may be a generic male voice model, voice model 2 a generic female voice model, voice model 3 a voice model of a known radio or television personality, voice model 4 a voice model of an end-user's grandfather, voice model 5 a voice model of a voice speaking English with a French accent, and so forth.

The short-term overlay storage portion 430 may provide a storage location for temporary information, such as special announcements, advertisements, and/or the like, which will be subsequently replaced with fresh information. Information stored in the short-term overlay storage portion 430 may be in the form of text data that is used, in conjunction with information from the above-described communication synthesis portion 420, to generate synthesized performance.

The macro portion 440 may contain separate sections for news, weather and traffic, for example, and may be updated as appropriate through the network 100 via load commands. The news, weather and traffic sections may be used like the short-term overlay storage 430 described above, storing information that will subsequently be replaced, and may store information in the form of text data that will be used, in conjunction with information from the above-described communication synthesis portion 420, to generate synthesized performance. Furthermore, the news, weather and/or traffic sections may contain standard weather report recordings and/or text data segments, such as "Today will be partly cloudy," "There is a 40% chance of rain," "Today's high temperature will be in the 80's," and so forth. In this case, rather than transmitting entire weather reports via the network 100, macro commands may be transmitted that activate reproduction of one or more appropriate standard recordings or text data segments that have been pre-stored in the macro portion 440. For example, a macro may be defined in which the three above-mentioned phrases are combined. When a command is received corresponding to this macro, the performance reproduction device outputs a synthesized or pre-recorded performance that says, "Today will be partly cloudy. There is a 40% chance of rain. Today's high temperature will be in the 80's."

The local station master table 450 may be a table of all performance transmitters, such as all radio stations, for example, within a given area, such as the United States or the world. The local station master table 450 may, for example, show the correlation between broadcasting frequency and call sign of radio stations, and may additionally contain description codes, such as a language code, music type code, or the like. The local station master table 450 may also be correlated with GPS information—e.g., the local station master table 450 may indicate what range of GPS coordinates can receive the broadcasting signal of a particular radio station.

Some examples of using the local station master table 450 are given below. In a first example, the performance reproduction device 300 is an enhanced radio in a traveling salesman's automobile. The salesman lives in Washington, D.C. and usually listens to radio stations located the Washington, D.C. and neighboring areas. The salesman then drives to California. The performance reproduction device 300 detects, using the GPS system, that it is now in a different area that is out of range of the Washington, D.C. radio stations, and therefore determines that information in the storage device 400 must be updated so that the performance reproduction device 300 can receive pseudo-live broadcasting from local stations that are now within broadcasting range. The performance reproduction device 300 then determines, based on an end-user profile stored in the profile memory 374, that the salesman wants to be able to listen to at least a jazz station, a classical station and an oldies station. The performance reproduction device 300 may then access the local station master table 450 and determine, based on current GPS coordinates of the performance reproduction device 300, a jazz station, a classical station and an oldies station that are within range. The performance reproduction device 300 may then determine, using the performance transmitter status detector 371 and/or the performance transmitter profiles 3744 of the performance information request device 370, when information can be requested from the respective radio stations. The performance reproduction device 300 may then generate an information request signal and/or tune in to the radio stations at an appropriate time to receive information. The radio stations then transmit the requested information, thus updating the appropriate sections of the storage device 400.

In another example, a vacationer from Atlanta, Ga. is on a cruise in the Mediterranean Sea, and wishes to listen to his or her favorite home radio station using the performance reproduction device 300. It is assumed for this example that satellite transmission or the like is used so that the home radio station in Atlanta can transmit to the performance reproduction device 300 in the Mediterranean. However, the vacationer wants to hear Mediterranean weather reports, rather than Atlanta weather reports, so the performance reproduction device 300 is programmed to find a local radio station, using the GPS system and the local station master table 450, and request weather information to include when reproducing a pseudo-live performance.

The long-term performance recordings portion 460 may include song storage sections Song 1-Song N (when the performance reproduction device 300 is an enhanced radio), movie storage sections (when the reproduction device is an enhanced television), and/or other types of performance recordings, for example. Each song storage section, movie storage section or the like may contain a pre-stored song or movie or the like, or may include empty sections, thus providing a space for a song or movie to be stored in the future. Parts of the long-term performance recordings portion 460 may be read only, while other parts may be overwritten by other information.

Each item of information in the long-term performance recordings portion 460, such as each song or movie, may be tagged with as much additional information as desired. For example, country music songs may be tagged with a "country" tag, songs about girls named "Charlene" may be appropriately tagged, and/or tags may be provided that cause the name of the song, the recording artist, and/or the like to appear on a display while the song is being reproduced. These tags may, for example, be accessed by the above-described commands. For example, a command may instruct that songs having a "Garth Brooks" tag be played in succession.

It should be appreciated that there may be various other portions included in the storage device 400, such as an advertisement portion, a commercial portion and/or the like. It should also be appreciated that the storage device may contain fewer storage portions than are shown in FIG. 6. For example, the storage device may contain only the long-term performance recordings portion 460.

The commands described above may be transmitted and/or stored as part of larger command sequences. This allows an extended period of pseudo-live performance generation to be programmed in advance. Exemplary command sequences are described below.

Figure 7:
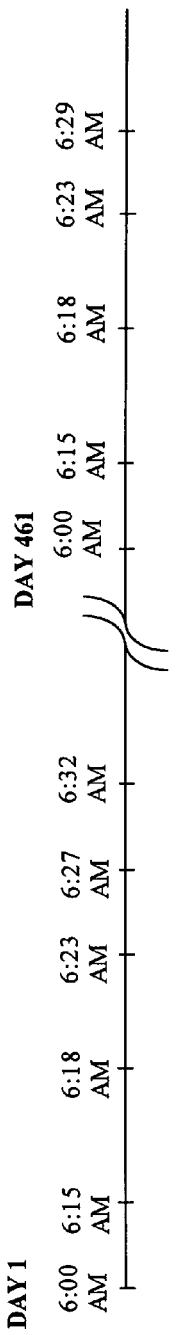
FIGS. 7-9 show exemplary diagrams of command sequences.
Figure 7:
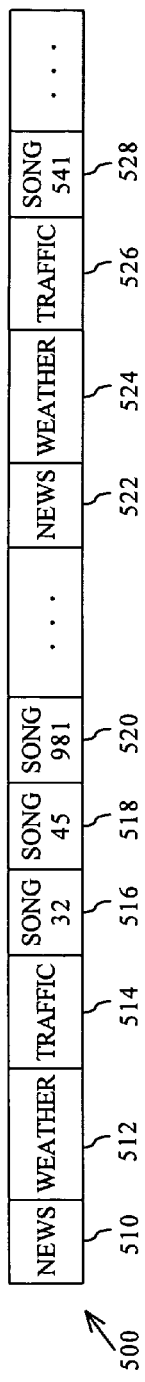

FIG. 7 is a diagram of one exemplary command sequence 500. The command sequence 500 includes "news" commands 510 and 522, "weather" commands 512 and 524, "traffic" commands 514 and 526, and "song" commands 516, 518, 520 and 528. In this example, at 6:00 AM on Day 1 of programming, the "news" command 510 causes news information to be reproduced from the "news" storage portion of the macro portion 440 (FIG. 5) of the storage device 400. Next, at 6:15 AM, the "weather" command 512 causes weather information to be reproduced from the "weather" storage portion of the macro portion 440 of the storage device 400. At 6:18 AM, the "traffic" command 514 causes traffic information to be reproduced from the "traffic" storage portion of the macro portion 440 of the storage device 400. Then "song" commands 516, 518 and 520 cause song 32, song 45 and song 981 to be reproduced from the long-term performance recordings portion 450 of the storage device 400 at 6:23 AM, 6:27 AM and 6:32 AM, respectively.

The command sequence 500 may be as long as desired, and may include commands for reproducing information that has not yet been stored. For example, the command sequence 500 includes the "news" command 522 for reproducing news information from the storage device 400 on Day 461 of programming, but it is obvious that, at the time the command sequence 500 is sent, the news for Day 461 is not yet known.

Therefore, the "news" storage portion of the macro portion 440 of the storage device 400 will be updated with fresh news information for Day 461 at some time prior to 6:00 AM on Day 461, for example, and then this updated information will be reproduced at 6:00 AM on Day 461 based on the previously transmitted command sequence.

Furthermore, the command sequence 500 itself may be updated or interrupted. For example, according to the command sequence 500, song 541 is scheduled to be reproduced at 6:23 AM on Day 461. However, if it is desired to transmit an urgent and/or unexpected public announcement at 6:20 AM, for example, the public announcement may be transmitted and stored in the storage device 400 and a new command corresponding to the public announcement may be transmitted to replace the "song" command 528. Then, at 6:23 AM, rather than reproducing song 541, as previously scheduled, the performance reproduction device 300 will reproduce the public announcement. Alternatively, at 6:20 AM, the public announcement may, as a real-time transmission, interrupt the traffic information that is currently being reproduced based on the "traffic" command 526.

Figure 8:
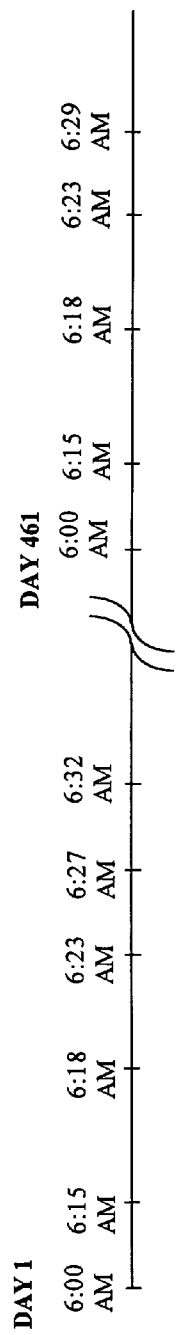
Figure 8:
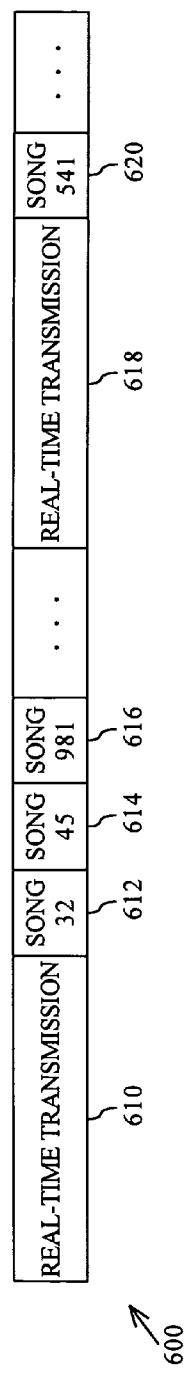

FIG. 8 is a diagram of another exemplary command sequence 600. The command sequence 600 is similar to the command sequence 500, except that the "news", "weather" and "traffic" commands are replaced with "real-time transmission" blocks 610 and 618. In this case, rather than pre-storing news, weather and traffic information in the storage device 400, the news, weather and traffic information, and/or any other desired information, is transmitted in real-time to the performance reproduction device 300 during the indicated time blocks.

Figure 9:
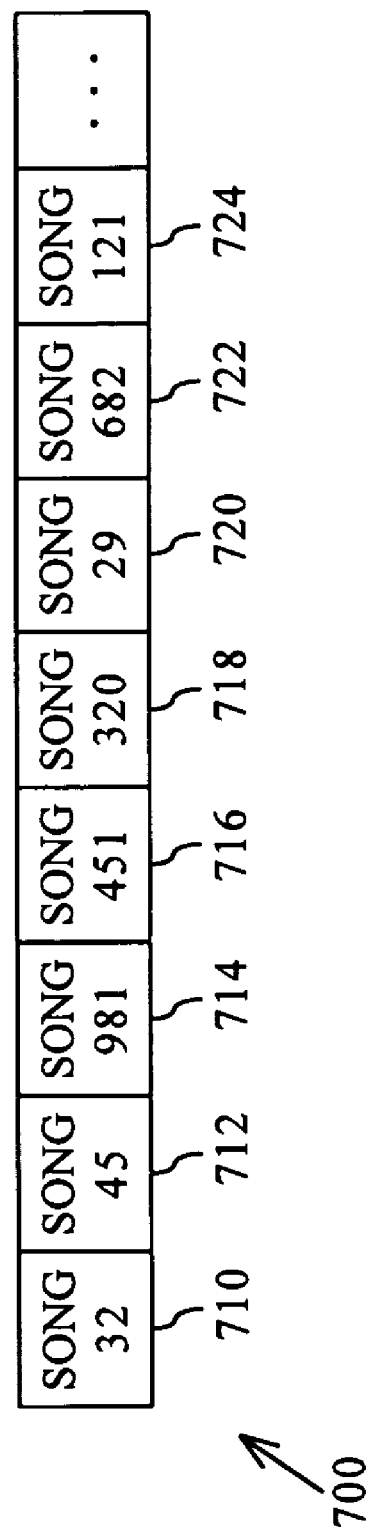

FIG. 9 is a diagram of yet another exemplary command sequence 700. The command sequence 700 is not necessarily time dependent. The command sequence 700 includes "song" commands 710, 712, 714, 716, 720, 722, 724, . . . , which cause songs to be reproduced from the storage device in the order of song 32, song 45, song 981, song 451, song 320, song 29, song 682, song 121, . . . . The order of the songs may be generated randomly, may be determined by a software program (programming commands), or may be selected as desired by one or more persons involved with transmitting or pre-storing the command sequence 700. Furthermore, the command sequence 700 may contain one or more commands corresponding to songs that have not yet been stored in the storage device.

Using the command sequence 700, the performance reproduction device 300 reproduces songs in the instructed order until a signal is received from the network 100. The performance reproduction device 300 treats this receipt of a signal as a command to reproduce performance information received from the network 100. The performance reproduction device 300 then inserts performance information received from the network 100 into the mix of information being reproduced.

In FIGS. 7-9, individual commands are part of larger command sequences. However, it should be appreciated that commands may be transmitted and/or stored individually, if desired or appropriate.

Program sequences may be generated by the reproduction device 300 by using programming commands such as loops, branches, if-then-else statements, and/or case statements as is well known to those skilled in software programming art. Special commands may handle real-time performances or account for unexpected circumstances such as storage failure, etc.

When it is desired to transmit information to the performance reproduction device 300, the performance transmitter 200 may, by keeping track of the time, know when a break, such as a break between songs, will occur and transmit a signal at this break. Alternatively, the performance transmitter 200 may transmit the signal at an arbitrary time, and the performance reproduction device 300 may receive the signal, temporarily store information transmitted from the performance transmitter via the network 100, and reproduce the transmitted information at the next available, or otherwise designated, break. Obviously, if a transmission from the performance transmitter 200 is urgent (e.g., national emergency), information such as a song, for example, that is currently being reproduced by the performance reproduction device 300 may be interrupted.

After the command sequence 700 has been thus interrupted and information received through the network 100 has been reproduced, the performance reproduction device 700 may continue reproducing songs according to the command sequence 700. Alternatively, a new command sequence may be followed.

Several examples of specific operations performed using the above-described network 100, performance transmitter 200, performance reproduction device 300 and storage device 400 are described below. In a first example, the performance transmitter 200 is a radio station, the performance reproduction device 300 is an enhanced radio, and the storage device 400 has been pre-loaded with a library of songs. A radio announcer speaks into a microphone, which is included in the performance input device 220 of FIG. 2, and says, for example, "Here are the three most-requested songs of this week." The announcer then pushes one or more buttons, for example, on the command input device 230, and a command signal sequence including a Play 1 command appending the announcer's real-time performance is generated and transmitted to the network 100.

The announcer's voice information announcing "Here are the three most-requested songs of this week" is output through the performance output device 320, corresponding in this case to a radio speaker, based on the Play 1 command. The remaining command signal sequence is executed by retrieving the three songs from the storage device 400 and outputting them to the radio speaker in the order indicated by the command signal sequence.

The radio station may transmit addition program information any time before the reproduction of the songs is completed. For example, the radio announcer may announce, "We will be back with more music after these messages from our sponsors" and then issue commands for reproduction of pre-recorded commercials or the like. The corresponding commands are transmitted to the performance reproduction device 300 prior to the actual performance output time. Thus, the radio station is provided great flexibility in performance production because the time of performance production is not tightly coupled to the time of performance output.

In a second example, the performance transmitter 200 may be a television station, and the performance reproduction device 300 may be an enhanced television set. The end-user watches a new episode of a weekly program. While the end-user is watching the new episode, the new episode is simultaneously recorded to the storage device 400. Months later, it is decided to re-run the episode. However, rather than re-transmitting the entire episode, the television station transmits one or more command signals to the enhanced television set, instructing the enhanced television set to retrieve and output the episode from the storage device 400.

In a third example, the performance transmitter 200 is a radio station and the performance reproduction device 300 is an enhanced car radio. At 1:00 AM, the end-user is asleep at home in Washington, D.C., and is not listening to the car radio. However, the radio station receives world news information from the British Broadcasting Company in Great Britain, and automatically stores this information to the storage device 400, along with one or more commands. Later, at 7:30 AM, while driving to work, the end-user listens to the car radio. Based on the previously transmitted one or more commands, the car radio retrieves and reproduces the information that was stored earlier that morning beginning at 1:00 AM. In this manner, information may be transferred to the car radio at low network usage times and any time prior to the generation of a performance. Furthermore, from this example it is seen that a real-time radio announcer is not required.

Figure 10:
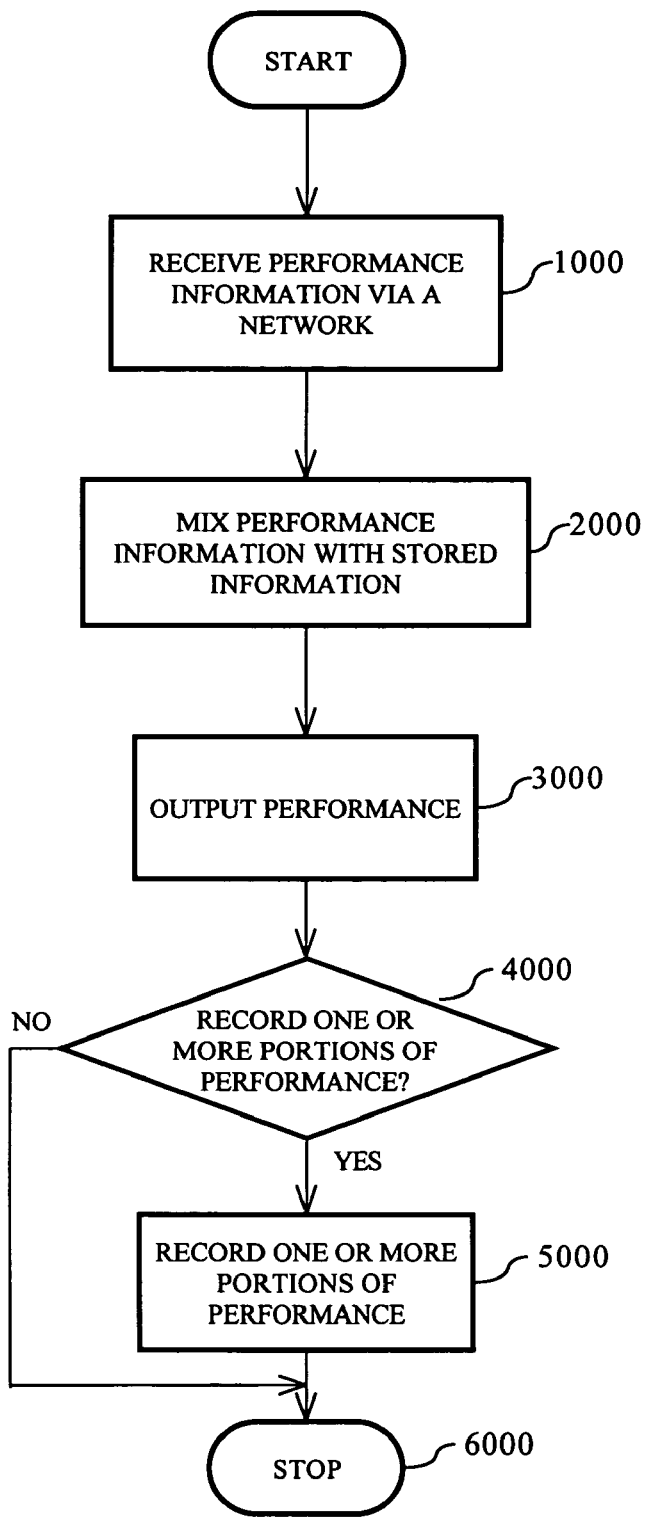
FIG. 10 is a flowchart of an exemplary method for outputting a performance.

FIG. 10 is a flowchart of an exemplary process for outputting a performance in response to information received from the network 100. In step 1000, the process receives performance information via the network 100 and goes to step 2000. In step 2000, the process decodes commands, if necessary, and mixes the performance information with stored information and goes to step 3000. In step 3000, the process outputs a performance and goes to step 4000.

In step 4000, the process determines whether one or more portions of the performance should be recorded. This determination may, for example, be based on whether the one or more portions of the performance are already stored in a local storage device. If the result of the determination of step 4000 is "YES", the process continues to step 5000. Otherwise, the process jumps to step 6000. In step 5000, the process records one or more portions of the performance and goes to step 6000 and ends.

It should be appreciated that steps 1000-5000 may be performed concurrently for different portions of the program. Furthermore, it should be appreciated that some embodiments of the invention may not implement steps 4000-6000. Also, the performance reproduction device 300 may independently generate the bulk of the performance based on performance generation programs already stored in the storage device 400, and the performance generation programs may respond to information received via the network 100 to redirect the performance output.

Figure 11:
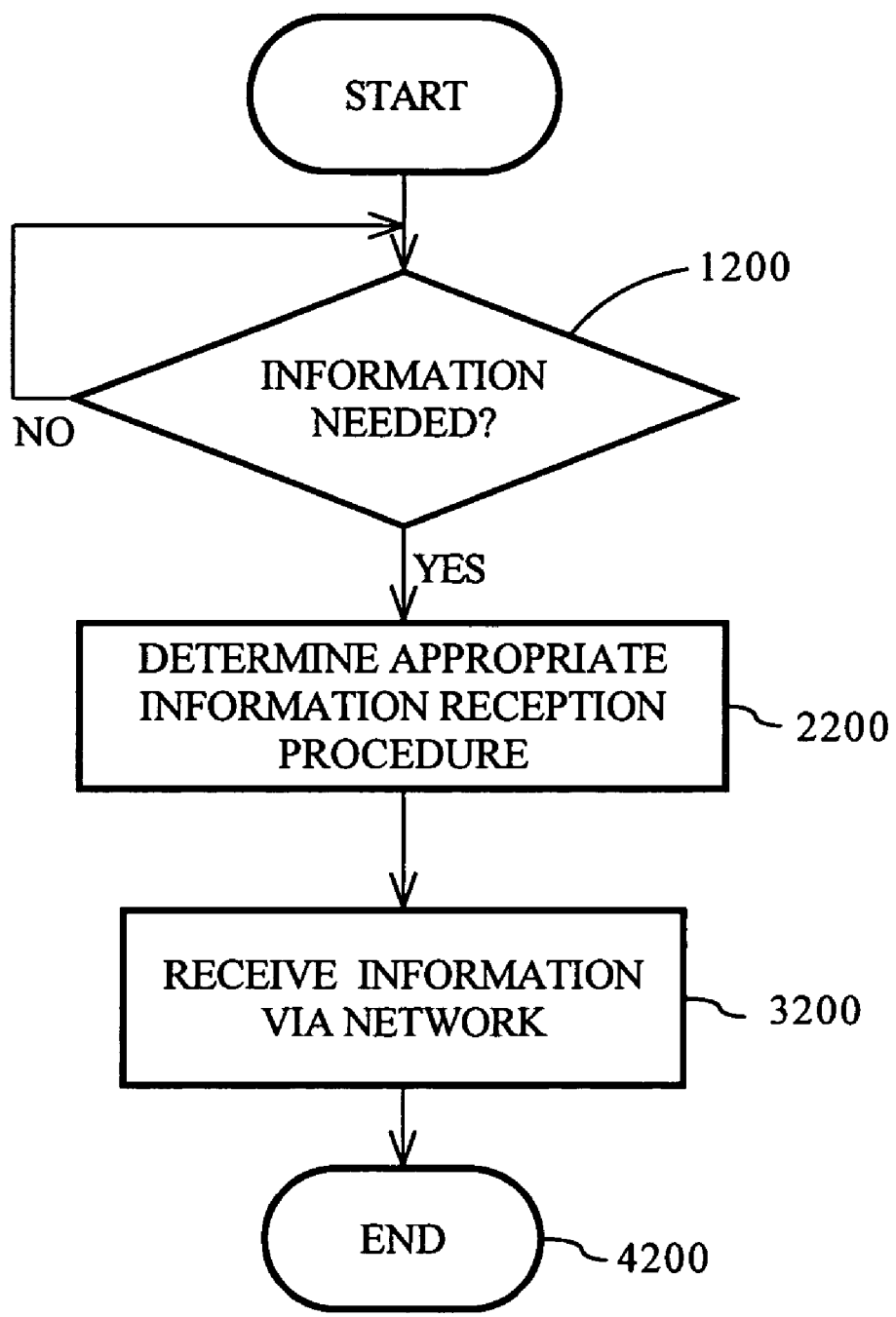
FIG. 11 is a flowchart of an exemplary method for receiving performance information.

FIG. 11 is a flowchart of an exemplary method for receiving performance information. In step 1200, the process determines whether information is needed. This step is repeated until the determination result is "YES". The process then continues to step 2200 and determines an appropriate information reception procedure. Next, in step 3200, the process receives the requested information via a network. The process then goes to step 4200 and ends.

Figure 12:
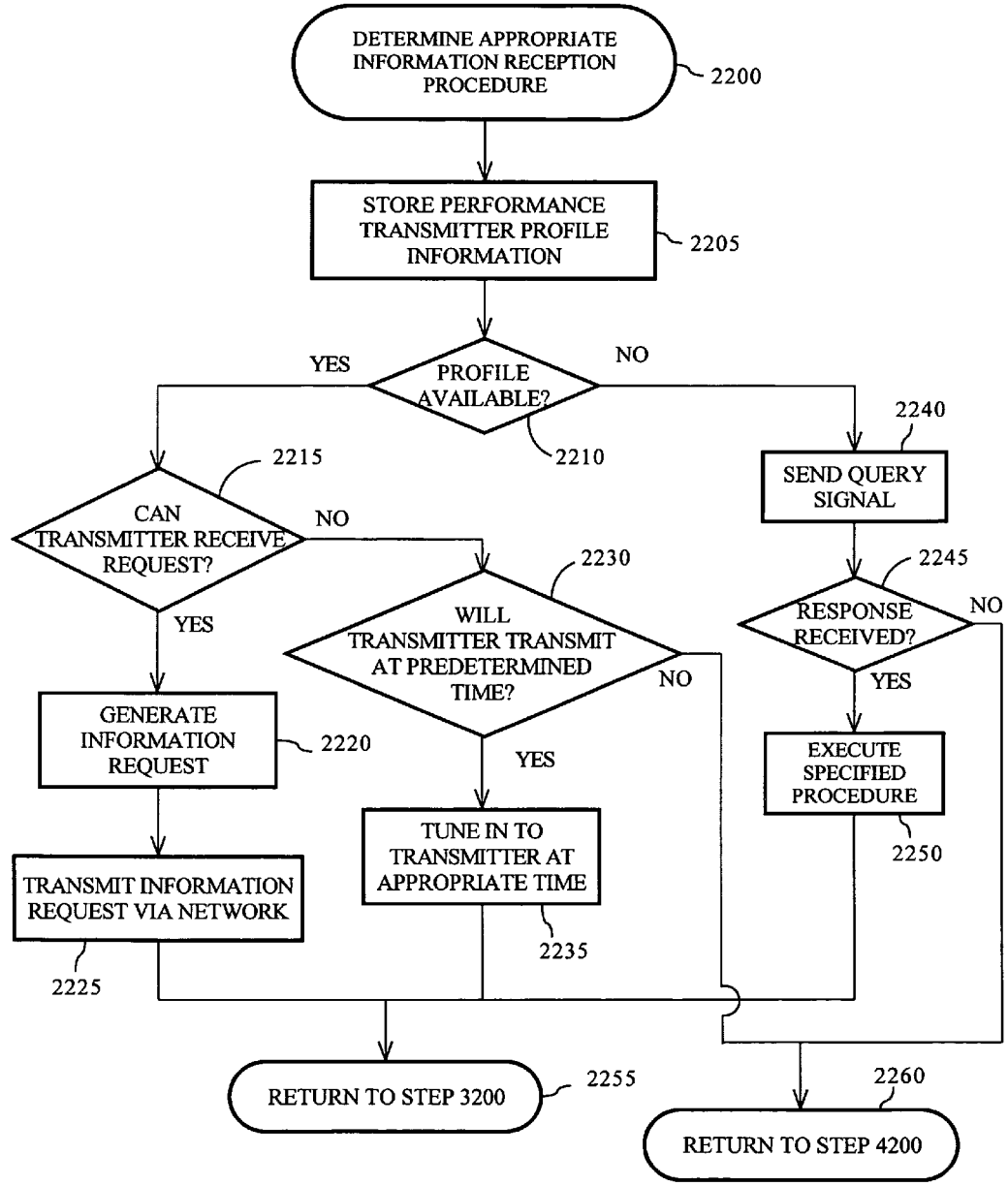
FIG. 12 is a flowchart of an exemplary method for determining an appropriate information reception procedure.

FIG. 12 is a flowchart of an exemplary method for determining an appropriate information reception procedure of step 2200. In step 2205, the process may store performance transmitter profile information. For example, as described above, performance transmitter profiles may indicate set times at which performance transmitters, such as radio or television stations, broadcast data for storing. The performance transmitter profiles may also indicate predicted peak times of network use by individual performance transmitters, and/or performance transmitter capability information, such as whether a particular performance transmitter has the capability to respond to individual user requests for information.

The performance transmitter profile information may be stored in advance, or may be transmitted over the network 100, for example. The performance transmitter profile information may be transmitted over the regular transmitting channel or frequency of a performance transmitter, or transmitted over a separate channel or frequency available to the performance transmitter. As an example of a separate channel or frequency, the performance transmitter could transmit the performance transmitter profile information over a sideband, or over a separate channel provided especially for such a purpose. A designated channel or frequency, such as TV channel "1", could be commonly used by a plurality of performance transmitters to transmit performance transmitter profile information. The transmitted profile information may be entire profiles, or may be updates to existing profiles.

After performance transmitter profile information is stored, the process continues to step 2210 and determines whether a profile is available for a designated performance transmitter. This may be done, for example, by automatically scanning through a list of profiles when a radio is tuned to a specific channel, and determining whether the tuned-in channel has a profile available, or by scanning through the list of profiles in response to an end-user's request that has been input. If a profile is available, the process goes to step 2215. Otherwise, the process goes to step 2240.

In step 2215, the process determines, based on the available profile, whether the designated performance transmitter can receive a request. If the performance transmitter can receive a request, the process goes to step 2220. Otherwise, the process goes to step 2230. In step 2220, the process generates an information request, then goes to step 2225 and transmits the request to the performance transmitter via a network, and then goes to step 2255.

In step 2230, the process determines whether the performance transmitter will transmit information at a predetermined time. If the performance transmitter will transmit information, the process goes to step 2235. If the performance transmitter will not transmit information, the process goes to step 2260. In step 2235, the process tunes in to the performance transmitter at the appropriate time, and goes to step 2255. In step 2255, the process returns to step 3200 of FIG. 11.

In step 2240, the process sends a query signal to the designated performance transmitter to determine whether the performance transmitter can transmit the needed information. The query signal may, for example, simply be a "ping" or the like. The query signal may be transmitted over a sideband or a specially designated channel or frequency, which may be established by convention. For example, it may be established by convention that all performance transmitters who are going to receive query signals will receive the query signals on a sideband adjacent to their normal transmitting frequency or bandwidth, for example.

The process then goes to step 2245 and determines whether a response has been received from the performance transmitter. If a response is received, the process goes to step 2250. Otherwise, the process goes to step 2260.

In step 2250, the process executes a procedure specified in the response received from the performance transmitter. For example, if the performance transmitter can respond to an individual request for information, the response may say, in effect, "Yes, I am here, and I can respond to your individual request. Tell me what information you need," or "Get ready to receive all the information I have available to transmit now." If the performance transmitter cannot respond to individual requests, the response may say, in effect, "I cannot transmit performance information in response to individual requests, but I will transmit general update information at 5:10 am, 11:10 am, 3:10 pm and 8:10 pm. Tune in at one of those times." The process in step 2250 does as instructed, then goes to step 2260 and returns to step 4200 of FIG. 11.

It should be appreciated that, in some embodiments, profile information may not be stored, and thus, for example, step 2205 will be unnecessary.

Figure 13:
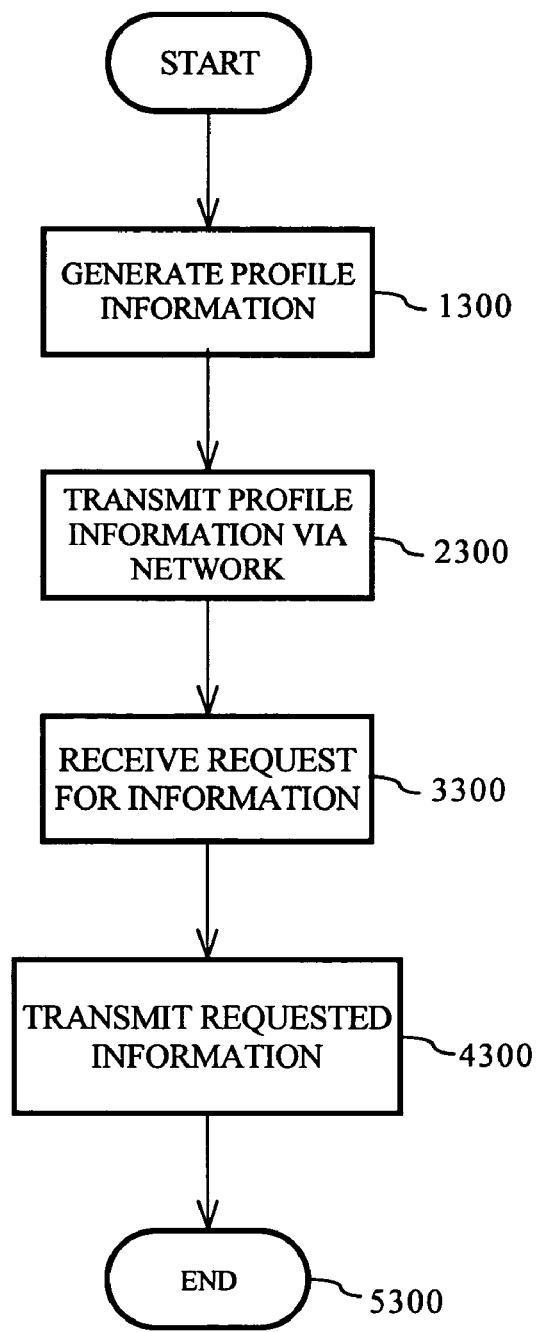
FIG. 13 is a flowchart of an exemplary method for transmitting information.

FIG. 13 is a flowchart of an exemplary method for transmitting information. In step 1300, the process may generate profile information, such as the performance transmitter profile information described above in connection with FIG. 12, and then goes to step 2300. In step 2300, the process transmits the profile information to a performance reproduction device 300 or a storage device 400 via the network 100. This transmission may be performed over the transmission channel normally used by a performance transmission device, or may be over a separate channel or bandwidth, for example, such as a sideband or a specially designated channel or frequency. The process then goes to step 3300.

In step 3300, the process receives a request from a performance reproduction device 300 for performance information. The process then goes to step 4300 and transmits the requested information. The process finally goes to step 5300 and ends.

The performance transmitter 200 and the performance reproduction device 300 can each be implemented on a general purpose or special purpose computer, a programmed microprocessor or microcontroller and peripheral integrated circuit elements, an application specific integrated circuit (ASIC) or other integrated or non-integrated circuit, a programmable logic device such as a PLD, PLA, FPGA or PAL, or the like, or any appropriate combination thereof. In general, any device capable of implementing at least some portions of the flowcharts shown in FIGS. 3 and 9 can be used to implement the performance transmitter 200 or the performance reproduction device 300.

Using the above-described embodiments, "pseudo-live" transmission may be performed in which, although the performance reproduced by a performance reproduction device has the appearance of a "fully live" transmission, part of the performance has actually been stored in or near the performance reproduction device in advance. The end-user may not even realize that this is the case.

While the invention has been described in conjunction with the specific embodiments described above, many equivalent alternatives, modifications and variations will become apparent to those skilled in the art once given this disclosure. For example, the performance transmitter 200 and the performance reproduction device 300 are shown in FIGS. 2 and 4 using bus architecture when any other architecture may be used as is well known in the art. Accordingly, the exemplary embodiments of the invention as set forth above are considered to be illustrative and not limiting. Various changes to the described embodiments may be made without departing from the spirit and scope of the invention.

For example, although the embodiments described above use the Global Positioning System, any other suitable positions detecting system could be used. For example, cell phones transmit a unique identification signal, based upon which their position with respect to a network can be determined. This technology is another example of position detecting technology that may be employed within the scope of the invention.

What is claimed is:

1. A method for receiving video performance content over a network for generating a pseudo-live performance, the method comprising:
   detecting a need for the video performance content by determining whether stored video performance content is out-of-date, wherein the stored video performance content is determined to be out-of-date based on a video performance content class of the stored video performance content;
   selecting a process for obtaining the video performance content from at least one of a plurality of performance transmitters based on a range of global positioning system (GPS) coordinates that can receive a broadcasting signal from the at least one of the plurality of performance transmitters;
   executing via a processor the process for obtaining the video performance content from the at least one of the plurality of performance transmitters; and
   generating the pseudo-live performance by mixing content corresponding to a portion of the video performance content with other content,
   wherein generating the pseudo-live performance by mixing content further comprises providing a translation of at least a portion of the pseudo-live performance in a different language, and wherein determining whether stored video performance content is out-of-date further comprises:
      transmitting a query to determine a time of a latest update of the stored video performance content;
      receiving the time of the latest update of the stored video performance content in response to the transmitting of the query;
      accessing a time-stamp of the stored video performance content;
      determining whether the time-stamp of the stored video performance content matches the time of the latest update of the stored video performance content the time-stamp associated with a time the stored video performance content was stored.

2. The method of claim 1, further comprising:
   accessing a profile, wherein the profile indicates one or more of:
      a type of content desired by an end-user;
      a schedule of an end-user; and
      scheduled times at which content is transmitted by the at least one of the plurality of performance transmitters.

3. The method of claim 1, further comprising determining whether a performance transmitter is capable of receiving and responding to a content request, wherein the determining further comprises at least one of:
   transmitting a query signal to the at least one of the plurality of performance transmitters;
   passively receiving a signal from the at least one of the plurality of performance transmitters; and
   accessing a profile.

4. The method of claim 1, further comprising:
   generating a content request; and
   transmitting the content request to the at least one of the plurality of performance transmitters via the network.

5. The method of claim 1, wherein the selecting the process comprises determining an appropriate time to receive content from a performance transmitter.

6. The method of claim 1, wherein generating the pseudo-live performance comprises:
   retrieving the other content;
   decoding at least one command of the other content; and
   performing at least one task instructed by the commands.

7. The method of claim 6, wherein the at least one command includes at least one of: a programming command that executes a software program, a housekeeping command that performs at least one of loading, deleting, changing and overlaying stored content, and a performance command that reproduces stored content from a specified location of a storage device.

8. The method of claim 1, wherein the video performance content includes multimedia video performance content.

9. A pseudo-live video performance generator, comprising a controller with a processor that:
   detects a need for video performance content by determining that stored video performance content is out-of-date, wherein the stored video performance content is determined to be out-of-date based on a video performance content class of the stored video performance content;
   selects a process for obtaining the video performance content from at least one of a plurality of performance transmitters based on a range of global positioning system (GPS) coordinates that can receive a broadcasting signal from the at least one of the plurality of performance transmitters;
   executes the process for obtaining the video performance content from the at least one of the plurality of performance transmitters; and
   generates the pseudo-live performance by mixing content corresponding to a portion of the video performance content with other content,
   wherein when the controller generates the pseudo-live performance by mixing content, actions of the control comprise providing a translation of at least a portion of the pseudo-live performance in a different language, and
   wherein when the controller determines that stored video performance content is out-of-date, actions of the controller comprise:
      accessing a time of a latest update of the stored video performance content,
      accessing a time-stamp of the stored video performance content, and
      determining whether the time-stamp of the stored video performance content matches the time of a latest update of the stored video performance content the time-stamp associated with a time the stored video performance content was stored.

10. The pseudo-live performance generator of claim 9, further comprising:
   accessing a profile, wherein the profile indicates at least one of:
      a type of content desired by an end-user;
      a schedule of an end-user; and
      scheduled times at which content is transmitted the at least one of the plurality of performance transmitters.

11. The pseudo-live performance generator of claim 9, wherein the controller performs at least one of:
   transmitting a query signal to the at least one of the plurality of performance transmitters;
   passively receiving a signal from the at least one of the plurality of performance transmitters; and
   accessing a profile.

12. The pseudo-live performance generator of claim 9, further comprising:
   a request generator that generates a content request, wherein the controller transmits the content request to the at least one of the plurality of performance transmitters via the network.

13. The pseudo-live performance generator of claim 9, wherein the controller determines an appropriate time to receive content from the at least one of the plurality of performance transmitters.

14. The pseudo-live performance generator of claim 9, wherein the controller:
   retrieves the other content;
   decodes a command of the other content; and
   performs a task instructed by the command.

15. The pseudo-live performance generator of claim 14, wherein the command includes at least one of: a programming command that executes a software program, a housekeeping command that performs at least one of loading, deleting, changing and overlaying stored content, and a performance command that reproduces stored content from a specified location of a storage device.

16. The pseudo-live performance generator of claim 9, wherein the video performance content includes multimedia video performance content.

* * * * *